United States Patent Office 3,795,682
Patented Mar. 5, 1974

3,795,682
SYNTHESIS OF CYCLIC KETALS
Serge Y. Delavarenne, Wemmel, Belgium, assignor to Union Carbide Corporation, New York, N.Y.
No Drawing. Filed July 27, 1970, Ser. No. 58,696
Int. Cl. C07d 13/04
U.S. Cl. 260—340.9                2 Claims

ABSTRACT OF THE DISCLOSURE

Cyclic ketals are produced by contacting a dehydrating agent with a compound of the formula:

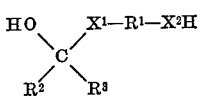

wherein $X^1$ represents oxy, thio, or nitrilo, wherein $X^2$ represents oxy, thio, or imino, provided that at least one of $X^1$ and $X^2$ represents oxy, wherein $R^1$ represents an alkylene group of from 2 to 4 carbon atoms or a 2-butenylene group, and wherein $R^2$ and $R^3$ individually represent halogenated alkyl groups the alpha carbon atoms of which are free of hydrogen and have at least one fluoro group, the remainder of the halo groups on the alkyl being fluoro, chloro, or bromo. The cyclic ketals produced are represented by the formula:

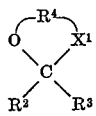

wherein $X^1$, $R^2$, and $R^3$ are as defined above, and wherein $R^4$ represents alkylene of 2 to 4 carbon atoms or substituted alkylene. The dehydrating agents employed include carbodiimides and alpha-aminoacetylenes. The process of the invention is useful for the preparation of 1,3-dioxolanes, 1,3 - dioxanes, 1,3 - dioxepanes, and their analogues wherein one of the oxygen atoms in the heterocyclic ring is replaced by either a sulfur atom or a nitrilo group.

---

The invention relates to the production of cyclic ketals. In a particular aspect, the invention relates to a process for the production of bis(fluoro-alkyl)-substituted cyclic ketals and certain of their sulfur- and nitrogen-containing analogues.

It is known that hexafluoroacetone, for example, reacts exothermally with alcohols to give the corresponding hemiketal in accordance with the reaction:

(1) 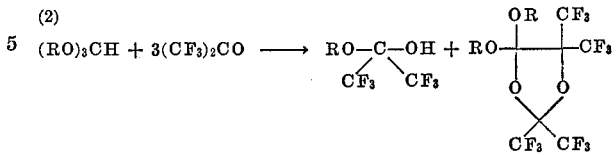

Because of the two trifluoromethyl groups, the hydroxyl group in the above hemiketal is strongly acidic, and it can be either alkylated or acylated (Gambaryan et al., Angewandte Chem. Intern. Ed. 5, 947, 1966, and Krespan et al., Fluorine Chemistry Reviews, 1, 145, 1967). However, in contrast with non-fluorinated derivatives, the hemiketal does not undergo the conventional acid catalyzed ketal formation, and therefore the preparation of, for example, 2,2 - bis(trifluoromethyl) - 1,3 - dioxolane from hexafluoroacetone and ethylene glycol in acidic medium has not been successfully carried out. Because of this problem, a number of different methods for the preparation of dioxolanes and other cyclic ketals bearing 2,2-bis(fluoroalkyl) groups have been disclosed.

For instance, Braun (J. Amer. Chem. Soc. 87, 5516, 1965, J. Org. Chem., 31, 1147, 1966, and U.S. Pat. 3,361,-787) has disclosed the reaction of a trialkyl orthoformate with hexafluoroacetone to prepare the corresponding hemiketal and 2,2,4,4 - tetrakis(trifluoromethyl) - 1,3-dioxolane in accordance with the reaction:

(2) 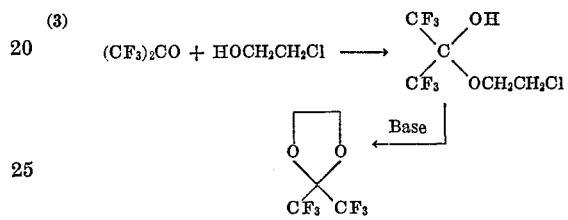

This method has the disadvantage that it is useful for the preparation of only a limited group of compounds, and must utilize an excess of the expensive hexafluoroacetone.

Simmons et al., in J. Amer. Chem. Soc. 82, 2288 (1960) and U.S. Pat. 2,925,424, have disclosed the reaction of hexafluoroacetone with ethylene chlorohydrin, followed by condensing the hemiketal with a base, in accordance with the following reactions;

(3) 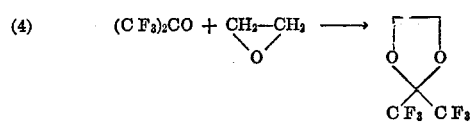

This process has the limitation that the yields are low.

The most general of the prior art methods for preparing 2,2-bis(trifluoromethyl)-dioxolanes is the reaction of an epoxide with hexafluoroacetone in the presence of various catalysts. This reaction is disclosed in U.S. Pat. Nos. 3,324,144; 3,324,145; 3,285,936; 3,314,850 and 3,488,335 and in British Pat. 1,034,495. The general reaction scheme of these processes is as follows:

(4) 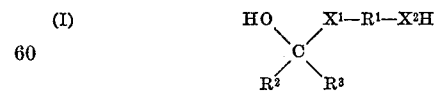

The limitation on the above types of reaction is the availability of desired epoxides, and the fact that it is limited to the preparation of dioxolanes, and cannot be employed to prepare heterocyclic compounds having 6 or 7 members in the ring.

In accordance with the present invention a broadly useful reaction for the preparation of cyclic ketals and certain of their sulfur and nitrogen containing analogues, from certain fluorinated ketones has been discovered. The process of the invention contemplates contacting a dehydrating agent with the hemiketal addition product of a fluorinated ketone and a compound containing at least one hydroxyl group, and at least one additional hydroxyl, thiol, or imino group. The process of the invention comprises contacting the dehydrating agent with a compound having the formula:

(I) 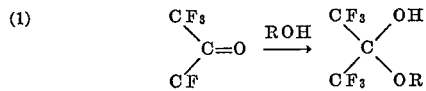

wherein $X^1$ represents oxy, thio, or nitrilo, wherein $X^2$ represents oxy, thio, or imino, provided that at least one of $X^1$ and $X^2$ represents oxy, wherein $R^1$ represents an alkylene group of from 2 to 4 carbon atoms or a 2-butenylene group, and wherein $R^2$ and $R^3$ individually represent halogenated alkyl groups the alpha carbon atoms of which are free of hydrogen, and preferably have at least two halo groups, have at least one fluoro group, the remainder of the halo groups on the alkyl being fluoro, chloro, or bromo. The halogenated alkyl groups can have from 1 to, for example, 10 carbon atoms, preferably from 1 to 4 carbon atoms, and more preferably 1 carbon atom. Preferably, the $R^2$ and $R^3$ groups are perhalogenated. In general, fluoro and chloro are the preferred halo groups, and fluoro is more preferred. The $R^1$ alkylene group can be unsubstituted or it can be substituted. Permissible substituent groups include hydroxyl, alkyl, vinyl, haloalkyl, ethynyl, alkoxy, and the like. Also the $R^2$ and $R^3$ groups can be joined together to form, along with the carbon atom to which they are bonded, a five- to seven-membered halogenated cyclo-aliphatic ring.

The product of the process of the invention is a cyclic ketal of the formula:

(II)

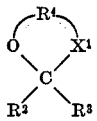

wherein $X^1$, $R^2$, and $R^3$ are as defined above, and wherein $R^4$ represents a substituted or unsubstituted alkylene group of from 2 to 4 carbon atoms. The substituent groups that can be present include those indicated above for the $R^1$ variable.

The condensing or dehydrating reagents that are employed in the invention are either a carbodiimide or an alpha-aminoacetylene. These materials are known compositions of matter that can be produced by known reactions. For instance, the preparation of carbodiimides is disclosed in the following references:

H. G. Khorana, Chem. Reviews, 53, 145 (1953);
F. Kurzer et al., Chem. Reviews, 67, 107 (1967).

The following reference, for instance, discloses the production of alpha-aminoacetylenes: H. G. Viehe, Angewandte Chemie, International Edition, 6, 767–778, (1967, No. 9).

Among the carbodiimides that can be employed as the dehydrating agent are those that can be represented by the formula:

(III)      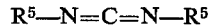

wherein each $R^5$ individually can be a hydrocarbyl group such as alkyl, cycloalkyl, aryl, aralkyl, alkaryl, and the like. Preferably, the hydrocarbyl group contains not more than 12 carbon atoms (because the high homologs are expensive to prepare in quantity), and more preferably not more than 8 carbon atoms. Specific illustrative examples of useful carbodiimides include dimethyl carbodiimide, diethyl carbodiimide, dipropyl carbodiimide, dioctyl carbodiimide, didecyl carbodiimide, diphenyl carbodiimide, dicyclohexyl carbodiimide, dibenzyl carbodiimide, ditolyl carbodiimide, and the like. Dicyclohexyl carbodiimide is most preferred.

Among the alpha-aminoacetylenes that can be employed as the dehydrating agent are those that can be represented by the formulas:

(IV)      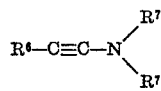

and (V)      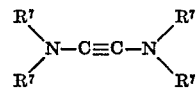

wherein $R^6$ represents hydrogen or a hydrocarbyl group having, for instance, up to 12 carbon atoms, such as alkyl, aryl, cycloalkyl, alkaryl, and aralkyl, and wherein each $R^7$ individually represents alkyl, cycloalkyl, aryl, or two $R^7$ groups joined together to form, together with the nitrogen to which they are attached, a heterocyclic group such as morpholinyl, pyrrolidyl, or piperidyl. Preferred $R^6$ groups include methyl and phenyl, and preferred $R^7$ groups include methyl, ethyl, and other lower alkyl. Specific illustrative alpha-aminoacetylenes that can be employed include 1-(N,N-diethylamino)propyne-1, 1-(N,N-dimethylamino)propyne-1, 1 - (N,N - dimethylamino)-2-phenylacetylene, 1,2-bis(N,N - dimethylamino)acetylene, 1,2-bis(N,N-diethylamino)acetylene, and the like.

The second reactant employed in the process of the invention is a hemiketal derivative of a fluorinated ketone, as represented by Formula I, above. The hemiketal is prepared by reacting a fluorinated ketone with a hydroxy reactant. The fluorinated ketones contemplated are a known class of compounds, and are represented by the formula:

(VI)      

wherein $R^2$ and $R^3$ are as defined above with respect to Formula I. Specific illustrative fluorinated ketones include hexafluoroacetone, sym.-tetrafluorodichloroacetone, sym.-difluorotetrachloroacetone, perfluoroethyl perfluoropropyl ketone, bis(perfluoropropyl) ketone, perfluoromethyl perfluoropropyl ketone, bis(perfluoroethyl)ketone, perfluorocyclopentanone, perfluorocyclohexanone, bis(perfluorohexyl) ketone, bis(omegahydroperfluorobutyl) ketone, perfluorobutyl perfluoroethyl ketone, and the like.

The hemiketal reactant is prepared by reacting the fluorinated ketone with a hydroxy reactant, i.e., a compound having at least one hydroxyl group, and at least one additional hydroxyl, thiol, or secondary amino group.

Among the classes of hydroxy reactants that are useful for reaction with the fluorinated ketone are the alkanediols. Specific illustrative alkanediols include ethylene glycol, propylene glycol, 1,3-dihyroxypropane, 1,2-, 1,3-, 1,4-, and 2,3-dihydroxybutane 1,2- 1,3- 1,4- 2,3- and 2,4-dihydroxypentane, 1,2-dihydroxyhexane, 1,3-dihydroxyheptane, 1,3-dihydroxyoctane, 4,5-dihydroxydecane, 1,3-dihydroxydodecane, 1,4-dihydroxytetradecane, 1,2 - dihydroxyoctane, and the like.

The hydroxy reactant can also contain other functional groups such as halo substituents, hydroxyl groups, ethylenic unsaturation, ether oxygen, and the like. Specific illustrative examples of such compounds include glycerol, 1,4-dihydroxybut-2-ene, 1-chloro-2,3-dihydroxypropane, 3,4-dihydroxy-1-butene, 1,5-hexadiene-3,4-diol, 3-chloro-2-methyl-1,2-propanediol, 2-ethoxy-1,2 - dihydroxyethane, and the like.

The hydroxy compound can also contain an imino group or a thiol group as the other reactive substituent. Specific illustrative examples of such compounds include N-hydrocarbyl alcohols such as N-alkyl alcohols, N-aryl alcohols, N-cycloalkyl alcohols, thio alcohols, and the like. Specific illustrations of such compounds include 2-(N-methylamino)ethanol,
2-(N-ethylamino)ethanol,
3-(N-methylamino)propanol-1,
3-(N-ethylamino)propanol-1,
3-(N-methylamino)propanol-2,
3-(N-ethylamino)propanol-2,
4-(N-methylamino)butanol-1, -2, and -3,
4-(N-ethylamino)butanol-1, -2, and -3,
2-(N-phenylamino)ethanol,
3-(N-phenylamino)propanol-1 and -2,
3-mercapto-propanol-1,
4-mercapto-butanol-1, thioglycol,
3-(N-methylamino)-1,2-propanediol,
3-(N-phenylamino)-1,2-propanediol,
3-mercapto-1,2-propanediol, and the like.

As the foregoing discussion illustrates, a wide variety of compounds can be employed as the hydroxy compound. The hydroxy compound can contain many types of substituent groups in addition to those specifically indicated above. The principal restrictions on the hydroxy compound are (1) that the hydroxyl group and the other functional group (i.e., hydroxyl, mercapto, or secondary amino group) be so positioned that a 5-, 6-, or 7-membered heterocyclic ring is ultimately produced by the process of the invention, and (2) that the hydroxy compound be free of groups that would interfere in either the preparation of the hemiketal or in the cyclization to the cyclic ketal. Such interfering groups will be recognized by those having ordinary skill in the art. Examples of such interfering groups include primary amino groups, hydrazino groups, and others that would react with the carbonyl group in the fluorinated ketone to form undesired products. Other groups to be avoided include sulfonic acid groups, carboxylic acid groups, and ester groups in positions alpha to the hydroxyl group or the other functional group. Normally, the hydroxy compound will have not more than 20 carbon atoms.

The reaction employed for the preparation of the hemiketal reactant is a known type of reaction. In general, stiochiometric amounts (i.e., equimolar amounts) of the fluorinated ketone and hydroxy compound are contacted in the cold (e.g., at about 0° C.). Inert solvents can be employed, if desired. Yields of about 90 percent are normally encountered under these conditions. Krespan et al., Fluorine Chem. Reviews, P. Tarrant Ed., vol. 1, 152 (1967), have described the reaction of mono-alcohols with fluorinated ketones to produce hemiketals. The subject hydroxy compounds are employed in the hemiketal forming reaction by procedures analogous to those described by Krespan et al. for the monoalcohols.

The process of the invention is carried out by contacting the above described hemiketal with the dehydrating agent. The reaction can be carried out in standard equipment and it is continued for a period of time and at a temperature sufficient to produce the desired ketal product. The reaction temperature employed is not narrowly critical. The initial reaction between the dehydrating agent is an addition reaction wherein the dehydrating agent adds to either the hydroxyl group of the hemiketal or to the —$X^2H$ group (which is either a hydroxyl, mercapto, or secondary amino group). This addition reaction occurs substantially instantaneously at ambient temperatures. The cyclization is then effected by heating. Thus, the process of the invention broadly is normally carried out at temperatures within the range of from about 20° C. to about 150° C., preferably from about 50° C. to about 130° C., and more preferably from about 100° C. to about 125° C. The reaction temperature should not exceed the decomposition temperature of the hemiketal reactant, which will vary from one hemiketal to another.

At the temperatures indicated above, the reaction normally takes from about 0.5 to about 2 hours and preferably, about 1 hour.

Normally the reactants are employed in approximately equivalent amounts, that is, about 1 mole of dehydrating agent is employed per mole of hemiketal. If desired, a solvent can be employed as the reaction medium, although such use is not required. Solvents such as diethyl ether, tetrahydrofurane, dimethoxyethane, dimethoxypropane, and other oxygenated solvents can be employed. At the completion of the reaction, the heterocyclic compound product can be recovered by gently distilling the reaction mixture, either under vacuum or at atmospheric pressure, which ever is desired. The hetreocyclic product can thus be recovered from the reaction mixture by simple distillation, or by fractional distillation if a solvent is employed.

The process of the invention is a useful process for the preparation of a wide variety of 2,2-bis(haloalkyl)oxazolidines; -1,3-oxathiolanes; -1,3-dioxolanes; -tetrahydro-1,3-oxazines; -1,3-oxathiane; -1,3-dioxanes; -hexahydro-1,3-oxazepines; -1,3-dioxepanes; and -1,3-oxathiepanes.

With the exception of the 1,3-oxathiepanes which have not heretofore been reported, the cyclic ketals that can be produced by the process of the invention constitute known classes of compositions having known utility. For instance, utility of 2,2-bis(haloalkyl)-1,3-dioxolanes is described in U.S. Pat. Nos. 3,314,850; 3,324,144; 3,325,145; 3,488,335; 3,285,936; 2,925,424 (this patent also describes utility for the 2,2-bis(haloalkyl)-1,3-dioxanes and -dioxepanes) and 2,901,514. The nitrogen and sulfur containing analogues that can also be produced by the process of the invention can be used as solvents for coatings resins and other organic materials, surface active agents, and the like.

The following examples illustrate certain aspects of the invention:

EXAMPLE 1

In a well-stirred solution of 0.12 mole (7.45 gr.) of ethylene glycol in 100 ml. of ether was condensed at 0° C. in about one hour 0.12 mole (20 gr.) of perfluoroacetone. After the addition was complete, the reaction mixture was allowed to warm to room temperature. To the resulting hemiketal was then immediately added dropwise over a period of about 5 minutes 0.14 mole (28.8 gr.) of N,N'-dicyclohexylcarbodiimide dissolved in the minimum amount of ether. After evaporation of the solvent, the flask containing the reaction mixture was equipped for distillation and heated in an oil bath at about 125° C. The pure 2,2-bis(trifluoromethyl)-1,3-dioxolane distills slowly at 103°–105° C./760 mm. Hg; $n_D^{20}=1.3111$. Yield: 80%. (20.1 grams).

EXAMPLE 2

Using the same procedure described in Example 1, but replacing diethyl ether by 1,2-dimethoxyethane, 0.12 mole of commercial glycerol was treated at 0° C. with 0.12 mole of perfluoroacetone, followed by the addition at room temperature of 0.14 mole of N,N'-dicyclohexylcarbodiimide. Treatment of the reaction mixture at 100° C./15 mm. Hg leads to 23.1 gr. of pure 2,2-bis(trifluoromethyl)-4-hydroxymethyl-1,3-dioxolane. Yield: 80%. B.P.: 72° C./15 mm. Hg. $n_D^{20}=1.3536$.

EXAMPLES 3–11

A series of cyclic ketals were produced from the hemiketals of perfluoroacetone and various hydroxy compounds utilizing N,N'-dicyclohexylcarbodiimide as the dehydrating agent. The procedures employed were analogous to that described in Example 1. The table below displays the hydroxy compounds, ketal products, yields, boiling points, and various reaction variables for these examples. In each case, 0.12 M of hydroxy compound and perfluoroacetone were used, and 0.15 M of dehydrating agent was used (except for Example 3, wherein 0.12 M of dehydrating agent was used). 50 milliliters of diethyl ether was used as the solvent in each of the examples. In Examples 3–4 and 7–9, dimethoxyethane has been employed in place of ether with no influence on yields. In Example 6, tetrahydrofurane can be used as the solvent with no influence on yield. Reaction times (i.e., distillation times after evaporation of the solvent) were about 1 hour for Examples 3, 4, 6, 8 and 11, and about 0.5 hour for Examples 5, 7, 9 and 10. Reaction temperatures were 100° C. in all cases except for Example 7, wherein a temperature of 125° C. was used. A vacuum of about 50 mm. Hg was applied during the distillation. The pure product is obtained either directly by distillation from the reaction mixture or by fractionation of the distillate.

TABLE

| Ex. | Hydroxy compound | Product | Yield, gms, percent | B.P., °C./mm. Hg |
|---|---|---|---|---|
| 3 | 1,3-propylene glycol. | 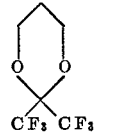 | 16.1, 60 | 134–136/760 |
| 4 | 1,4-butylene glycol. | 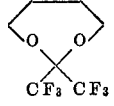 | 8.6, 30 | 82–85/90 |

TABLE—Continued

| Ex. | Hydroxy compound | Product | Yield, gms, percent | B.P., °C./ mm. Hg |
|---|---|---|---|---|
| 5 | 2,3-butylene glycol | H₃C—⟨O,O⟩(CF₃)(CF₃)—CH₃ | 21.5, 75 | 104–106/760 |
| 6 | Glycerol | ⟨O,O⟩(CF₃)(CF₃)—CH₂OH | 20.2, 70 | 72–73/15 |
| 7 | 1,4-dihydroxy-but-2-ene (cyclization is accompanied by an allylic rearrangement) | ⟨O,O⟩(CF₃)(CF₃)—CH=CH₂ | 14.2, 50 | 120–124/760 |
| 8 | 1,2-propylene glycol | ⟨O,O⟩(CF₃)(CF₃)—CH₃ | 16.0, 60 | 103–106/760 |
| 9 | 3-chloro-1,2-dihydroxy-propane | ⟨O,O⟩(CF₃)(CF₃)—CH₂Cl | 23.3, 75 | 72–75/70 |
| 10 | 2-(N-methylamino)-ethanol | ⟨O,N-CH₃⟩(CF₃)(CF₃) | 10.8, 40 | 80–81/150 |
| 11 | Thioglycol | ⟨O,S⟩(CF₃)(CF₃) | 13.5, 50 | 75–77/150 |

EXAMPLE 12

Using the same procedure described in Example 1, 0.12 mole (7.45 g.) of ethylene glycol was treated at 0° with 0.12 mole of perfluoroacetone followed by addition at room temperature of 0.15 mole (16.65 g.) of 1-(N,N-diethylamino)propyne-1. After evaporation of the solvent, the reaction mixture was heated slowly to 100° C. under vacuum (50 mm. Hg). The distillate was recovered in a flask immersed in a Dry Ice-acetone bath. Final purification was achieved using a P.T.F.E. spinning band column and afforded 7.5 g. of pure 2,2-bis(trifluoromethyl)-1,3-dioxolane. B.P.: 103°–105°/760 mm. Hg. Yield: 30%.

What is claimed is:

1. Process which comprises the steps of contacting:
   (a) a carbodiimide of the formula:

$$R^5—N=C=N—R^5$$

wherein each $R^5$ individually represents a hydrocarbon selected from the group consisting of alkyl, cycloalkyl, aryl, aralkyl, or alkaryl of up to 12 carbon atoms, with
   (b) a compound of the formula:

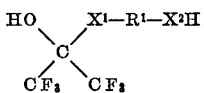

wherein $X^1$ and $X^2$ represent oxy, wherein $R^1$ represents alkylene of from 2 to 4 carbon atoms or 2-butenylene, at a temperature within the range of from about 20° C. to about 150° C., to produce a compound of the formula:

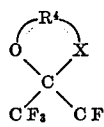

wherein X represents oxy and wherein $R^4$ represents an alkylene group of from 2 to 4 carbon atoms.

2. A process for the preparation of 2,2-bis(trifluoromethyl)-1,3-dioxolane which comprises contacting (a) N,N¹-dicyclohexyl-carbodiimide with (b) a compound of the formula:

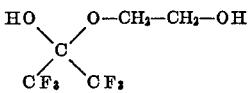

at a temperature within the range of from about 20° C. to about 150° C.

References Cited

Doorenbos et al., "Chemical Abstracts," vol. 63 (1965), col. 10017c.

NICHOLAS S. RIZZO, Primary Examiner

J. H. TURNIPSEED, Assistant Examiner

U.S. Cl. X.R.

260—239 R, 247, 307 F, 327 M, 338, 340.7